(12) United States Patent
Perez et al.

(10) Patent No.: US 11,230,650 B2
(45) Date of Patent: Jan. 25, 2022

(54) POLYMER BLENDS FOR USE IN MULTILAYER STRUCTURE AND MULTILAYER STRUCTURES COMPRISING THE SAME

(71) Applicant: Dow Global Technologies LLC, Midland, MI (US)

(72) Inventors: Carmelo Declet Perez, Pearland, TX (US); Brian W. Walther, Lake Jackson, TX (US); James L. Cooper, Brazoria, TX (US); Hayley A. Brown, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 451 days.

(21) Appl. No.: 16/340,978

(22) PCT Filed: Nov. 17, 2017

(86) PCT No.: PCT/US2017/062277
§ 371 (c)(1),
(2) Date: Apr. 10, 2019

(87) PCT Pub. No.: WO2018/094197
PCT Pub. Date: May 24, 2018

(65) Prior Publication Data
US 2019/0292423 A1 Sep. 26, 2019

Related U.S. Application Data

(60) Provisional application No. 62/424,101, filed on Nov. 18, 2016.

(51) Int. Cl.
| | | |
|---|---|---|
| *C08L 23/08* | (2006.01) | |
| *B32B 15/08* | (2006.01) | |
| *B32B 27/32* | (2006.01) | |
| *C09J 123/08* | (2006.01) | |
| *B32B 5/02* | (2006.01) | |
| *B32B 15/082* | (2006.01) | |
| *B32B 15/20* | (2006.01) | |
| *B65D 65/40* | (2006.01) | |
| *C08J 5/12* | (2006.01) | |
| *C09J 133/02* | (2006.01) | |

(52) U.S. Cl.
CPC ......... *C09J 123/0876* (2013.01); *B32B 5/022* (2013.01); *B32B 5/024* (2013.01); *B32B 15/082* (2013.01); *B32B 15/20* (2013.01); *B32B 27/32* (2013.01); *B65D 65/40* (2013.01); *C08J 5/128* (2013.01); *C08L 23/0876* (2013.01); *C09J 133/02* (2013.01); *B32B 2439/00* (2013.01); *C08J 2323/00* (2013.01); *C08J 2323/08* (2013.01); *C08J 2423/06* (2013.01); *C08J 2423/08* (2013.01); *C08J 2433/02* (2013.01); *C08L 2203/16* (2013.01)

(58) Field of Classification Search
CPC .. B32B 1/02; B32B 1/08; B32B 5/022; B32B 5/024; B32B 15/082; B32B 15/20; B32B 27/32; B32B 27/327; B32B 2439/00; B65D 65/40; C09J 123/0876; C09J 133/02; C08J 2323/00; C08J 2323/08; C08J 2423/06; C08J 2423/08; C08J 2433/02; C08L 23/0876
See application file for complete search history.

(56) References Cited

U.S. PATENT DOCUMENTS

| | | | |
|---|---|---|---|
| 4,678,836 A | 7/1987 | McKinney et al. | |
| 5,395,471 A | 3/1995 | Obijeski et al. | |
| 6,235,822 B1 | 5/2001 | Whetten et al. | |
| 6,903,161 B2 | 6/2005 | Morris | |
| 2004/0076846 A1 | 4/2004 | Domine et al. | |
| 2006/0189758 A1 | 8/2006 | Nakano et al. | |
| 2013/0203930 A1* | 8/2013 | Schininger | C08L 23/10 524/523 |

FOREIGN PATENT DOCUMENTS

| | | |
|---|---|---|
| EP | 0058980 A1 | 9/1982 |
| JP | 2004262166 A | 9/2004 |
| WO | 1999/007786 A1 | 2/1999 |

OTHER PUBLICATIONS

Cho, J. Adhes. Sci. Technol., 1997, vol. 11, p. 433-445.
Filippi, Macromol. Chem. Phys., 2002, vol. 203, p. 1512-1525.
PCT/US2017/062277, International Search Report and Written Opinion dated Feb. 13, 2018.
PCT/US2017/062277, International Preliminary Report on Patentability dated May 31, 2019.

* cited by examiner

*Primary Examiner* — Walter Aughenbaugh

(57) ABSTRACT

The present invention provides polymer blends that can be used in a multilayer structure and to multilayer structures comprising one or more layers formed from such blends. In one aspect, a polymer blend comprises an ionomer of a copolymer comprising ethylene and at least one of acrylic acid and methacrylic acid having a melt index ($I_2$) of 1 to 60 g/10 minutes, wherein the total amount of ionomer comprises 50 to 99 weight percent of the blend based on the total weight of the blend, and a polyolefin having a density of 0.870 g/cm$^3$ or more and having a melt index ($I_2$) of 20 g/10 minutes or less, wherein the polyolefin comprises 1 to 50 weight percent of the blend based on the total weight of the blend, wherein the polymer blend meets the following equation: $3.5 < 2.76 - 60*I_{2(PO)} + 308*RVR + 0.023*A < 4.5$ wherein $I_{2(PO)}$ is the melt index ($I_2$) of the polyolefin, RVR is the relative viscosity ratio of the polyolefin to the ionomer ($I_{2(PO)}/I_{2(ionomer)}$), and A is the weight percent of ionomer in the polymer blend based on the total weight of the blend.

10 Claims, No Drawings

POLYMER BLENDS FOR USE IN MULTILAYER STRUCTURE AND MULTILAYER STRUCTURES COMPRISING THE SAME

FIELD

The present invention relates to polymer blends that can be used in a multilayer structure and to multilayer structures comprising one or more layers formed from such polymer blends.

INTRODUCTION

Certain resins are used in tie layers in multilayer structures to provide adhesion between film layers and metal substrates such as aluminum. Despite a variety of resins being available for use in such tie layers, in some instances, some common tie layer resins can contribute negatively to the temperature sensitivity of the tie layer. Thus, there remains a need for alternative approaches for tie layers that can provide desirable adhesion to foil, metallized film, or similar substrates in multilayer structures while also providing other improvements over conventional approaches to tie layers.

SUMMARY

The present invention provides polymer blends that in some aspects provide desirable adhesion when used as a tie layer in a multilayer structure. Further, in some aspects, the present invention facilitates extrusion coating to form multilayer structures while minimizing undesirable effects such as draw down and neck-in. For example, embodiments of the present invention comprise a carefully selected blend of resins to achieve desirable adhesion.

In one aspect, the present invention provides a polymer blend that comprises an ionomer of a copolymer comprising ethylene and at least one of acrylic acid and methacrylic acid having a melt index ($I_2$) of 1 to 60 g/10 minutes, wherein the total amount of ionomer comprises 50 to 99 weight percent of the blend based on the total weight of the blend, and a polyolefin having a density of 0.870 g/cm³ or more and having a melt index ($I_2$) of 20 g/10 minutes or less, wherein the polyolefin comprises 1 to 50 weight percent of the blend based on the total weight of the blend, wherein the polymer blend meets the following equation:

$$3.5 < 2.76 - 60 * I_{2(PO)} + 308 * RVR + 0.023 * A < 4.5$$

wherein $I_{2(PO)}$ is the melt index ($I_2$) of the polyolefin, RVR is the relative viscosity ratio of the polyolefin to the ionomer ($I_{2(PO)}/I_{2(isomer)}$), and A is the weight percent of ionomer in the polymer blend based on the total weight of the blend.

In another aspect, the present invention provides a multilayer structure comprising at least two layers, each layer having opposing facial surfaces, wherein Layer A comprises any of the polymer blends of the present invention disclosed herein, and wherein Layer B comprises a substrate, wherein a top facial surface of Layer B is in adhering contact with a bottom facial surface of Layer A. In some embodiments, the substrate comprises aluminum foil.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

"Polypropylene" means a polymer having greater than 50 wt % units derived from propylene monomer.

The term, "ethylene/α-olefin interpolymer," as used herein, refers to an interpolymer that comprises, in polymerized form, a majority amount of ethylene monomer (based on the weight of the interpolymer), and a α-olefin.

The term, "ethylene/α-olefin copolymer," as used herein, refers to a copolymer that comprises, in polymerized form, a majority amount of ethylene monomer (based on the weight of the copolymer), and a α-olefin, as the only two monomer types.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272, 236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076, 698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

The term "multilayer structure" refers to any structure comprising two or more layers having different compositions and includes, without limitation, multilayer films, multilayer sheets, laminated films, multilayer rigid containers, multilayer pipes, and multilayer coated substrates.

Unless otherwise indicated herein, the following analytical methods are used in the describing aspects of the present invention:

"Density" is determined in accordance with ASTM D792.

"Melt index": Melt indices I$_2$ (or I2) and I$_{10}$ (or I$_{10}$) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

"Acid content": The acid content of ethylene/(meth) acrylic acid copolymers is measured in accordance with ASTM D4094.

"Adhesion to metal substrate": The adhesion of a layer to metal substrate is determined using a 180 degree peel test based on ASTM F904 with a crosshead speed (as specified) of 10 inches/minute. When characterizing the adhesion of a layer formed from a polymer blend to a metal substrate, the sample comprising the polymer blend layer and metal substrate is prepared and tested as described in the Examples.

Additional properties and test methods are described further herein.

In one aspect, the present invention provides a polymer blend that comprises an ionomer of a copolymer comprising ethylene and at least one of acrylic acid and methacrylic acid having a melt index (I$_2$) of 1 to 60 g/10 minutes, wherein the total amount of ionomer comprises 50 to 99 weight percent of the blend based on the total weight of the blend, and a polyolefin having a density of 0.870 g/cm$^3$ or more and having a melt index (I$_2$) of 20 g/10 minutes or less, wherein the polyolefin comprises 1 to 50 weight percent of the blend based on the total weight of the blend, wherein the polymer blend meets the following equation:

$$3.5 < 2.76 - 60 * I_{2(PO)} + 308 * RVR + 0.023 * A < 4.5$$

wherein I$_{2(PO)}$ is the melt index (I$_2$) of the polyolefin, RVR is the relative viscosity ratio of the polyolefin to the ionomer (I$_{2(PO)}$/I$_{2(monomer)}$, and A is the weight percent of ionomer in the polymer blend based on the total weight of the blend.

In some embodiments, the polyolefin comprises linear low density polyethylene, low density polyethylene, high density polyethylene, medium density polyethylene, polyolefin plastomer, polyolefin elastomer, polypropylene, ethylene/cyclic olefin copolymer, or a combination thereof. The polyolefin comprises low density polyethylene or linear low density polyethylene in some embodiments. The melt index (I$_2$) of the polyolefin, in some embodiments, is less than 10 g/10 minutes.

In some embodiments, the total amount of ionomer (including ionomers of ethylene/acrylic acid copolymers and ionomers of ethylene/methacrylic acid copolymers and ionomers of ethylene/methacrylic acid/acrylic acid copolymers) comprises 60 weight percent or more of the blend, and the polyolefin comprises 40 weight percent or less of the blend. The total amount of ionomer (including ionomers of ethylene/acrylic acid copolymers and ionomers of ethylene/methacrylic acid copolymers and ionomers of ethylene/methacrylic acid/acrylic acid copolymers) comprises 75 weight percent or more of the blend, and the polyolefin comprises 25 weight percent or less of the blend.

In one aspect, the present invention provides a polymer blend that comprises an ionomer of a copolymer comprising ethylene and methacrylic acid having a melt index (I$_2$) of 1 to 60 g/10 minutes, wherein the total amount of ionomer comprises 50 to 99 weight percent of the blend based on the total weight of the blend, and a polyolefin having a density of 0.870 g/cm$^3$ or more and having a melt index (I$_2$) of 20 g/10 minutes or less, wherein the polyolefin comprises 1 to 50 weight percent of the blend based on the total weight of the blend. In some embodiments, the polyolefin comprises linear low density polyethylene, low density polyethylene, high density polyethylene, medium density polyethylene, polyolefin plastomer, polyolefin elastomer, polypropylene, ethylene/cyclic olefin copolymer, or a combination thereof. The polyolefin comprises low density polyethylene or linear low density polyethylene in some embodiments. The melt index (I$_2$) of the polyolefin, in some embodiments, is less than 10 g/10 minutes. In some embodiments, the total amount of ethylene/methacrylic acid copolymer comprises 60 weight percent or more of the blend, and the polyolefin comprises 40 weight percent or less of the blend. The total amount of ethylene/methacrylic acid copolymer comprises 75 weight percent or more of the blend, and the polyolefin comprises 25 weight percent or less of the blend, in some embodiments.

In some embodiments, the metal used to neutralize the acrylic acid or methacrylic acid in the ionomer comprises $Zn^{+2}$, $Na^+$, $Li^+$, $Ca^{+2}$, $K^+$, $Mg^{+2}$, $Fe^{+2}$, or $Cu^{+2}$.

In some embodiments, the polymer blend further comprises at least one of an oxidant, a colorant, a slip agent, an antiblock, a processing aid, or a combination thereof.

The polymer blend can comprise a combination of two or more embodiments as described herein.

Embodiments of the present invention also relate to multilayer structures that include a layer formed from a polymer blend of the present invention. In one aspect, a multilayer structure comprises at least two layers, each layer having opposing facial surfaces, wherein Layer A comprises a polymer blend according to any of the embodiments disclosed herein, wherein Layer B comprises a substrate, and wherein a top facial surface of Layer B is in adhering contact with a bottom facial surface of Layer A. In some embodiments, the substrate comprises aluminum foil, metallized film, or a film layer comprising an ionomer. The adhesion of Layer A to Layer B is at least 3 N/inch when measured using a 180 degree peel test based on ASTM F904 with a crosshead speed of 10 inches/minute, in some embodiments. The adhesion of Layer A to Layer B, in some embodiments, is at least 5 N/inch when measured using a 180 degree peel test based on ASTM F904 with a crosshead speed of 10 inches/minute. In some embodiments, Layer A is extrusion coated on Layer B at a melt temperature of 300° C.

In some embodiments, the multilayer structure further comprises Layer C, wherein a top facial surface of Layer A is in adhering contact with a bottom facial surface of Layer C. In some such embodiments, Layer C comprises a polyolefin.

Multilayer structures of the present invention comprise a combination of two or more embodiments as described herein.

Embodiments of the present invention also relate to articles comprising any of the multilayer structures (e.g., multilayer films) disclosed herein.

Polymer Blends

Polymer blends according to embodiments of the present invention comprise an ionomer of a copolymer comprising ethylene and at least one of acrylic acid and methacrylic acid having certain features specified herein and a polyolefin having certain features as specified herein. For ease of reference, the copolymer comprising ethylene and at least one of acrylic acid and methacrylic acid will also be referred to herein as "ethylene/(meth)acrylic acid copolymer" with the understanding that some such copolymers can comprise both acrylic acid monomer and methacrylic acid monomer.

Ionomers are ionically crosslinked thermoplastics generally obtained by neutralizing a copolymer containing pendant acid groups (e.g., carboxylic acid groups) with an ionizable metal compound (e.g., a compound of the monovalent, divalent and/or trivalent metals of Group I, II, IV-A and VIIIB of the periodic table of the elements).

In embodiments of the present invention, the ionomer resins are derived from a copolymer of ethylene and acrylic acid and/or methacrylic acid. Prior to neutralization, the ethylene/(meth)acrylic acid copolymer used in some embodiments of the present invention can be characterized as having an acid content greater than 4 and up to 25 weight percent based on the weight of the copolymer. The ethylene/(meth)acrylic acid copolymer has an acid content greater than 5 weight percent and up to 15 weight percent based on the weight of the copolymer in some embodiments prior to neutralization. Prior to neutralization, the ethylene/(meth)acrylic acid copolymer has an acid content greater than 6 weight percent and up to 12 weight percent based on the weight of the copolymer in some embodiments. The ethylene/(meth)acrylic acid copolymer has an acid content greater than 7 weight percent and up to 12 weight percent based on the weight of the copolymer prior to neutralization in some embodiments.

The ethylene/(meth)acrylic acid copolymer used to form the ionomer can be characterized as a random copolymer. Such ethylene/(meth)acrylic acid copolymers can be prepared at high pressure by the action of a free-radical polymerization initiator, acting on a mixture of ethylene and acrylic acid and/or methacrylic acid monomers using techniques known to those of skill in the art. The ethylene/(meth) acrylic acid copolymers used in polymer blends of the present invention are more precisely referred to as interpolymers because they are formed by the polymerization of a mixture of the comonomers, in contradistinction to copolymers made by "grafting" or "block-polymerization" methods.

The ionomers used in polymer blends of the present invention are obtained by reacting the foregoing copolymers with a sufficient amount of metal ions as to neutralize at least some portion of the acid groups, preferably at least about 5 percent by weight and preferably from about 20 to about 100 percent by weight, of the acid groups present. Suitable metal ions include $Zn^{+2}$, $Na^+$, $Li^+$, $Ca^{+2}$, $K^+$, $Mg^{+2}$, $Fe^{+2}$, or $Cu^{+2}$. Particularly suitable metals for neutralizing the copolymers used herein are the alkali metals, particularly, cations such as sodium, lithium and potassium and alkaline earth metals, in particular, cations such as calcium, magnesium and zinc. One or more ionomers may be used in some embodiments.

The ionomer may further be characterized as having a melt index ($I_2$) of 1 to 60 g/10 minutes in some embodiments. All individual values and subranges between 1 and 60 g/10 minutes are included herein and disclosed herein. For example, the ionomer can have a melt index from a lower limit of 1, 5, 10, 15, or 20 g/10 minutes to an upper limit of 10, 15, 20, 25, 30, 35, 40, 45, 50, or 55 g/10 minutes. In some embodiments, the ionomer has a melt index ($I_2$) of 1 to 40 g/10 minutes, and 1 to 30 g/10 minutes in some embodiments. The ionomer has a melt index ($I_2$) of 1 to 15 g/10 minutes in some embodiments.

The polymer blend comprises 50 to 99 weight percent ionomer based on the weight of the blend in some embodiments. In some embodiments, the polymer blend comprises at least 60 weight percent ionomer based on the weight of the blend in some embodiments. In some embodiments, the polymer blend comprises at least 75 weight percent of the ionomer based on the weight of the blend. All individual values and subranges from 50 to 99 wt % are included and disclosed herein; for example, the amount of the ethylene/(meth)acrylic acid copolymer in the polymer blend can be from a lower limit of 50, 55, 60, 65, 70, 75, or 80 wt % to an upper limit of 75, 80, 85, 90, 95, or 99 wt %. For example, the amount of ethylene/(meth)acrylic acid copolymer in the polymer blend can be from 50 to 99 wt %, or in the alternative, from 60 to 95 wt %, or in the alternative, from 70 to 90 wt %, or in the alternative, from 75 to 90 wt %.

Examples of commercially available ionomers of ethylene/(meth)acrylic acid copolymers that can be used in embodiments of the present invention include AMPLIFY™ IO ionomers of ethylene/acrylic acid copolymers, such as AMPLIFY™ IO 3701, which were previously available commercially from The Dow Chemical Company, Surlyn ionomers of ethylene/methacrylic acid copolymers commercially available from DuPont, and ionomers of ethylene/acrylic acid available from SK Global Chemical Co., LTD.

In addition to an ionomer of ethylene/(meth)acrylic acid copolymer, polymer blends of the present invention further comprise a polyolefin having a density of 0.870 g/cm³ or more and a melt index ($I_2$) of 20 g/10 minutes or less. Such polyolefins can include polymers that comprises, in polymerized form, a majority amount of ethylene or propylene monomer (based on the weight of the polymer), and optionally may comprise one or more comonomers.

In some embodiments, the polyolefin comprises a polyethylene having a density of 0.870 g/cm³ or more and a melt index ($I_2$) of 20 g/10 minutes or less. All individual values and subranges from equal to or greater than 0.870 g/cm³ are included and disclosed herein; for example the density of the polyethylene can be equal to or greater than 0.870 g/cm³, or in the alternative, equal to or greater than 0.900 g/cm³, or in the alternative, equal to or greater than 0.910 g/cm³, or in the alternative, equal to or greater than 0.925 g/cm³, or in the alternative, equal to or greater than 0.935 g/cm³. In a particular embodiment, the polyethylene has a density equal or less than 0.970 g/cm³. All individual values and subranges from equal to or less than 0.970 g/cm³ are included and disclosed herein. For example, the density of the polyethylene can be equal to or less than 0.970 g/cm³, or in the alternative, equal to or less than 0.960 g/cm³, or in the alternative, equal to or less than 0.955 g/cm³, or in the alternative, equal to or less than 0.950 g/cm³, or in the alternative, equal to or less than 0.940 g/cm³. When the polyolefin comprises polypropylene, persons of skill in the art can identify an appropriate density for the polypropylene based on the teachings herein.

In some embodiments, the polyolefin has a melt index ($I_2$) of 20 g/10 minutes or less. All individual values and subranges up to 20 g/10 minutes are included herein and disclosed herein. For example, the polyolefin can have a melt index from a lower limit of 0.2, 0.25, 0.5, 0.75, 1, 2, 4, 5, 10 or 15 g/10 minutes to an upper limit of 1, 2, 4, 5, 10, or 15 g/10 minutes. The polyolefin has a melt index ($I_2$) of up to 15 g/10 minutes in some embodiments. The polyolefin has a melt index ($I_2$) of up to 10 g/10 minutes in some embodiments. In some embodiments, the polyolefin has a melt index ($I_2$) less than 5 g/10 minutes.

Polyethylenes that are particularly well-suited for use in some embodiments of the present invention include linear low density polyethylene (LLDPE), low density polyethylene (LDPE), high density polyethylene (HDPE), medium density polyethylene (MDPE), polyolefin elastomers, polyolefin plastomers, cyclic olefin copolymers, olefin block copolymers, and combinations thereof. In some embodiments, the polyolefin comprises low density polyethylene (LDPE) and/or linear low density polyethylene (LLDPE).

When the polyolefin comprises LDPE and/or LLDPE, the density of the LDPE or LLDPE will typically be in the range of 0.916 to 0.935 g/cm³. When the polyolefin comprises HDPE, the density of the HDPE will typically be in the range of greater than 0.935 g/cm³ up to 0.970 g/cm³.

Examples of commercially available LDPE that can be used in embodiments of the present invention include DOW™ LDPE 132i, DOW™ LDPE 4012, AGILITY™ 1001, and AGILITY™ 1021, as well as other low density polyethylenes, which are commercially available from The Dow Chemical Company. Examples of commercially available LLDPE that can be used in embodiments of the present invention include DOWLEX™ linear low density polyethylene, such as DOWLEX™ 2045 and DOWLEX™ 2740G as well as others, which are commercially available from The Dow Chemical Company. Examples of commercially available HDPE that can be used in embodiments of the present invention include DOW™ HDPE resins and DOWLEX™ 2050B, as well as other as other high density polyethylenes, which are commercially available from The Dow Chemical Company. In addition to HDPE resins, the polyolefin used in the polymer blend can also include enhanced polyethylenes having densities greater than 0.935 g/cm³. Examples of commercially available enhanced polyethylene resins having high densities that can be used in embodiments of the present invention include ELITE™, and other enhanced polyethylene resins which are commercially available from The Dow Chemical Company. Further, in some embodiments, the polyolefin used in the polymer blend can also include enhanced polyethylenes having densities of 0.935 g/cm³ or less such as, for example, ELITE™ enhanced polyethylenes commercially available from The Dow Chemical Company. Examples of commercially available polyolefin plastomers that can be used in embodiments of the present invention include AFFINITY™ polyolefin plastomers, such as AFFINITY™ PL 1880G as well as others, which are commercially available from The Dow Chemical Company. Examples of commercially available polyolefin elastomers that can be used in embodiments of the present invention include ENGAGE™ polyolefin elastomers, such as ENGAGE™ 8180 as well as others, which are commercially available from The Dow Chemical Company. Examples of commercially available olefin block copolymers that can be used in embodiments of the present invention include INFUSE™ olefin block copolymers, such as INFUSE™ 9107 as well as others, which are commercially available from The Dow Chemical Company.

Persons of skill in the art can select suitable commercially available polypropylenes for use in polymer blends based on the teachings herein.

The polymer blend comprises 1 to 50 weight percent polyolefin based on the weight of the blend in some embodiments. In some embodiments, the polymer blend comprises 40 weight percent or less polyolefin based on the weight of the blend in some embodiments. In some embodiments, the polymer blend comprises 25 weight percent or less of the polyolefin based on the weight of the blend. All individual values and subranges from 1 to 50 wt % are included and disclosed herein; for example, the amount of polyolefin in the polymer blend can be from a lower limit of 1, 5, 10, 15, 20, 25, 30, 35, or 40 wt % to an upper limit of 25, 30, 35, 40, 45, or 50 wt %. For example, the amount of polyolefin in the polymer blend can be from 1 to 45 wt %, or in the alternative, from 1 to 40 wt %, or in the alternative, from 1 to 25 wt %.

The relationship between the melt indexes ($I_2$) of the ionomer and the polyolefin as well as the amount of ionomer can be used to characterize polymer blends according to some embodiments. In some embodiments, a polymer blend of the present invention meets the following equation:

$$3.5 < 2.76 - 60 * I_{2(PO)} + 308 * RVR + 0.023 * A < 4.5$$

$I_{2(PO)}$ is the melt index ($I_2$) of the polyolefin. RVR is the relative viscosity ratio of the polyolefin to the ionomer, in other words, the melt index of the polyolefin ($I_{2(PO)}$) divided by the melt index of the ionomer ($I_{2(ionomer)}$), ($I_{2(PO)}/I_{2(ionomer)}$). A is the weight percent of ionomer in the polymer blend based on the total weight of the blend, expressed as a percentage. If the polymer blend includes 50 weight percent ionomer, then A=50. In some embodiments, a polymer blend of the present invention meets the following equation:

$$3.7 < 2.76 - 60*I_{2(PO)} + 308*RVR + 0.023*A < 4.5,$$

with the $I_{2(PO)}$, RVR, and A values being defined as above. In some embodiments, a polymer blend of the present invention meets the following equation:

$$3.9 < 2.76 - 60*I_{2(PO)} + 308*RVR + 0.023*A < 4.5,$$

with the $I_{2(PO)}$, RVR, and A values being defined as above.

While not wishing to be bound by any particular theory, it is believed that the relationship between the ionomer and polyolefin in the polymer blend defined by the above formula contributes to desirable adhesion when used as a tie layer in multilayer structure and particularly when one of the layers is a metal foil or a metallized film.

In some embodiments, the polymer blend further comprises one or more inorganic fillers. Examples of inorganic fillers that can be incorporated in polymer blends according to some embodiments include calcium carbonate, magnesium carbonate, or a combination thereof. Inorganic fillers can be included in some embodiments to reduce costs, improve sealing properties, improve prints, or other reasons. The polymer blend comprises up to 50 weight percent inorganic filler based on the weight of the blend in some embodiments. All individual values and subranges from 0 to 50 wt % are included and disclosed herein; for example, the amount of inorganic filler in the polymer blend can be from a lower limit of 1, 5, 10, 15, 20, 25, 30, 35, or 40 wt % to an upper limit of 25, 30, 35, 40, 45, or 50 wt %.

In some embodiments, the polymer blend can further comprise one or more additives known to those of skill in the art including, for example, antioxidants, colorants, slip agents, antiblocks, processing aids, and combinations thereof. In some embodiments, the polymer blend comprises up to 5 weight percent of such additives. All individual values and subranges from 0 to 5 wt % are included and disclosed herein; for example, the total amount of additives in the polymer blend can be from a lower limit of 0.5, 1, 1.5, 2, 2.5, 3, 3.5, 4, or 4.5 wt % to an upper limit of 1, 2, 3, 4, or 5 wt %.

As will be discussed below, a polymer blend of the present invention can be incorporated/converted into a final fabricated product (e.g., a multilayer structure) via extrusion coating (or other equipment) using techniques known to those of skill in the art based on the teachings herein.

Polymer blends of the present invention can be prepared by melt blending the prescribed amounts of the components with a twin screw extruder before feeding into an extrusion coater (or other equipment) for film fabrication. Such polymer blends can also be prepared by tumble blending the prescribed amounts of the components before feeding into the extrusion coater (or other equipment) for film fabrication. In some embodiments, polymer blends of the present invention can be in the form of pellets. For example, the individual components can be melt blended and then formed into pellets using a twin screw extruder or other techniques known to those of skill in the art based on the teachings herein. In some embodiments, a polymer blend can include the combination of a compounded pellet and additional polymer that is tumble blended before feeding into the extrusion coater. For example, a pellet comprising a blend of an ionomer of ethylene/(meth)acrylic acid copolymer and polyolefin (e.g., LDPE) can be tumble blended with additional polyolefin (e.g., additional LDPE) to provide a polymer blend having the desired weight percentages of ionomer and polyolefin.

Multilayer Structures

In some embodiments, the present invention relates to multilayer structures in which at least one layer is formed from a polymer blend according to any embodiment disclosed herein. The multilayer structure, in some embodiments, comprises at least two layers, with each having opposing facial surfaces. In such embodiments, a first layer (Layer A) (e.g., a layer comprising a polymer blend of the present invention) is in adhering contact with a second layer (Layer B), with a top facial surface of the second layer (Layer B) being in adhering contact with a bottom facial surface of the first layer (Layer A).

In embodiments wherein a first layer (Layer A) is formed from a polymer blend of the present invention, a second layer (Layer B) can comprise a substrate. Examples of substrates that can be used as the second layer (Layer B) in embodiments of the present invention include metal foils, woven mats (e.g., woven fiber glass mats), nonwoven mats (e.g., nonwoven fiber glass mats), scrims, metallized films (e.g., metallized PET), and polymeric films (e.g., oriented polypropylene, oriented PET, etc.), or a film layer comprising an ionomer. Polymer blends of the present invention are particularly useful in adhering to metal foils or metallized films. Any metal foil or metallized film may form the substrate onto which the polymer blend layer is applied. Exemplary metal foils include aluminum foil and copper foil. The foil, when present, may, but need not, be flame or corona treated or subjected to other treatment so as to improve wettability and/or adhesion. Exemplary metallized films include metallized PET films, metallized oriented polypropylene films, metallized polyamide films, and metallized polyethylene films. In some embodiments, substrates other than metal foils can also be flame or corona treated or subjected to other treatment so as to improve wettability and/or adhesions. In some such embodiments, the substrates comprise oriented polypropylene or oriented polyamide films. Persons of skill in the art can identify such substrates based on the teachings herein. In some embodiments, the substrate can comprise a film layer comprising an ionomer. In such embodiments, Layer A may perform as a sealant layer, and the other film layer comprising an ionomer may be the top layer of another structure and act as a sealant layer as well.

In some embodiments, a multilayer structure of the present invention comprises a first layer (Layer A) formed from a polymer blend according to any of the embodiments disclosed herein and a second layer (Layer B) comprising a metal substrate (e.g., a metal foil or a metallized film) in adhering contact with the first layer, wherein the adhesion of the first layer to metal substrate (e.g., metal foil) is at least 3 N/inch when measured using a 180 degree peel test based on ASTM F904 with a crosshead speed of 10 inches/minute, at least 5 N/inch in some embodiments, and at least 6 N/inch in other embodiments. In some embodiments, the metal substrate is aluminum foil.

In embodiments wherein the multilayer structure includes a metal foil layer (e.g., an aluminum foil layer), the metal foil has a thickness from 0.20 to 2.0 mil, more preferably from 0.20 to 0.50 mil. All individual values and subranges from 0.20 to 0.50 mil are included and disclosed herein; for example, the metal foil layer thickness can range from a lower limit of 0.20, 0.25, 0.30, 0.35, 0.40 or 0.45 mil to an upper limit of 0.30, 0.35, 0.40, 0.45, or 0.50 mil. For example, the metal foil layer thickness can range from 0.20 to 0.50 mil, or in the alternative, from 0.20 to 0.60 mil, or in the alternative, from 0.60 to 1.0 mil, or in the alternative, from 0.25 to 0.50 mil. To one skilled in the art the thickness of the metal foil layer is defined as sufficient for the application.

In embodiments wherein the multilayer structure includes a metallized film layer (e.g., a metallized PET film, a metallized oriented polypropylene film, a metallized polyamide film, or a metallized polyethylene film), the metallized layer on the film can have a variety of thicknesses depending on factors such as performance (e.g., barrier properties, opacity, etc.) and cost. In some embodiments, the metallized layer on the metallized film layer has a thickness from 3 to 40 nm. All individual values and subranges from 3 to 40 nm are included and disclosed herein; for example, the metallized layer thickness can range from a lower limit of 3, 5, 10, 17, 20, 22, 25, 30, or 35 nm to an upper limit of 10, 12, 15, 20, 23, 25, 32, 35, 37, or 40 nm. To one skilled in the art the thickness of the metallized layer of the metallized film is defined as sufficient for the application.

The layer formed from the polymer blend can be applied to a metal substrate layer (e.g., metal foil) by any acceptable manner, such as extrusion lamination and/or extrusion coating. In extrusion coating the polymer blend layer on the metal substrate layer (e.g., metal foil), in some embodiments, the polymer blends can maintain acceptable levels of neck-in and draw down speed while providing acceptable adhesion to the metal foil layer. Polymer blends of the present invention, in some embodiments, can be extrusion coated on a metal substrate layer at temperatures (e.g., ~300° C. or less) lower than temperatures (e.g., ~320° C.) used when a polymer layer comprising only low density polyethylene is extrusion coated, while still providing acceptable adhesion to the metal substrate. Thus, the ability to extrusion coat at a relatively lower temperature while achieving acceptable adhesion is one advantage of some embodiments of the present invention.

In some embodiments, a layer formed from a polymer blend of the present invention can be in adhering contact with another layer, in addition to a substrate (e.g., in addition to a metal foil layer). For example, in some embodiments, the layer formed from the polymer blend can additionally be in adhering contact with a layer comprising a polyolefin. That is, in such embodiments, the layer formed from a polymer blend of the present invention can be between the polyolefin layer and the substrate (e.g., the metal foil), with a top facial surface of the substrate being in adhering contact with a bottom facial surface of the polymer blend layer, and with a top facial surface of the polymer blend layer being in adhering contact with a bottom facial surface of the polyolefin layer.

In embodiments comprising a polyolefin layer, the polyolefin can be any polyethylene, polypropylene, and their derivatives (e.g., ethylene-propylene copolymer) known to those of skill in the art to be suitable for use as a layer in a multilayer structure based on the teachings herein. For example, the polyethylene that can be used in such a layer, as well as other layers in the multilayer structure, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), homogeneously branched ethylene/α-olefin copolymers made with a single site catalyst such as a metallocene catalyst or a constrained geometry catalyst, and combinations thereof. In some embodiments, polyethylenes used in the polyolefin layer can be made via gas-phase polymerization. In some embodiments, polyethylenes used in the polyolefin layer can be made by gas-phase, solution-phase or slurry polymerization or any combination thereof, using any type of reactor or reactor configuration known in the art.

Some embodiments of multilayer structures can include layers beyond those described above. For example, while not necessarily in adhering contact with a layer formed from a polymer blend according to the present invention (though, in some embodiments, such layers can be in contact with the layer formed from such a polymer blend), a multilayer structure can further comprise other layers typically included in multilayer structures depending on the application including, for example, barrier layers, sealant layers, tie layers, other polyethylene layers, polypropylene layers, etc. Additionally, other layers such as printed, high modulus, high gloss layers may be laminated to multilayer structures (e.g., films) of the present invention. Further, in some embodiments, the multi-layer structure can be extrusion coated to a fiber containing substrate such as paper or fiber glass (e.g., nonwoven mats, woven mats, scrims, and the like).

In addition to extrusion coating, multilayer structures of the present invention can be coextruded as blown films or cast films using techniques known to those of skill in the art based on the teachings herein. In some embodiments, multilayer structures of the present invention can also be formed by lamination or by a combination of blown/cast film followed by thermal lamination.

Packaging

In some embodiments, the present invention relates to packaging comprising the multilayer structure of any embodiment disclosed herein. In a particular embodiment, the packaging is a retort and/or sterilization packaging. The packaging may be used to contain, in various embodiments, solids, slurries, liquids, or gasses. By way of example and not limitation, the packaging may be used to contain acidic solutions, corn oil, alcohols, meats, cheeses, sun screen, shampoo, spice, soy sauce, creamer, flavored coffee, milk, juice, detergent, aseptic food, hot fill juice, fatty food, baby wipe, iodine solution, salad dressing, ketchup, sauces, and other items.

Some embodiments of the invention will now be described in detail in the following Examples.

EXAMPLES

The following raw materials are used in the examples discussed below:

| Product | Melt Index ($I_2$) (dg/min) | Density (g/cc) | Ion |
|---|---|---|---|
| DOW ™ LDPE 132i | 0.25 | 0.921 | — |
| AGILITY ™ 1001 | 0.65 | 0.920 | — |
| AGILITY ™ 1021 | 1.85 | 0.920 | — |
| ENGAGE ™ 8180 | 0.5 | 0.863 | — |
| AMPLIFY ™ IO 3701 | 5.2 | 0.940 | Zn |
| SURLYN 1702 | 14 | 0.950 | Zn |
| SURLYN 1652 | 5.2 | 0.940 | Zn |
| SURLYN 1650 | 1.8 | 0.940 | Zn |

DOW™ LDPE 132i, AGILITY™ 1001, and AGILITY™ 1021 are each low density polyethylene resins commercially available from The Dow Chemical Company. ENGAGE™

8180 is a polyolefin elastomer commercially available from The Dow Chemical Company. AMPLIFY™ IO 3701 is an ionomer of an ethylene/acrylic acid copolymer that was commercially available from The Dow Chemical Company. SURLYN 1650, 1652, and 1720 are ionomers of ethylene/methacrylic acid copolymer commercially available from DuPont.

The examples set forth below are used to illustrate the adhesion of the inventive polymer blend to an aluminum substrate. The aluminum substrate used in each of the examples is prepared as follows. A bleached, 30 pounds per ream paper is extrusion laminated to 0.00035 inch (0.35 mil) Grade A wettable aluminum foil using DOW™ LDPE 722 (The Dow Chemical Company). The laminated sheet is then cut into 3-4 foot lengths to provide the aluminum substrate. Masking tape is applied to the lead edge of the aluminum substrate. The aluminum substrate is not corona treated.

Example 1

A variety of multilayer structures are prepared as shown in Table 1:

TABLE 1

| | Layer A (percentages are weight %) | Layer B (Substrate) |
|---|---|---|
| Comparative Example A | 100% AMPLIFY ™ IO 3701 | Aluminum substrate |
| Comparative Example B | 90% AMPLIFY ™ IO 3701 10% AGILITY ™ 1021 | Aluminum substrate |
| Comparative Example C | 75% AMPLIFY ™ IO 3701 25% AGILITY ™ 1021 | Aluminum substrate |
| Comparative Example D | 50% AMPLIFY ™ IO 3701 50% AGILITY ™ 1021 | Aluminum substrate |
| Inventive Example 1 | 90% AMPLIFY ™ IO 3701 10% AGILITY ™ 1001 | Aluminum substrate |
| Inventive Example 2 | 75% AMPLIFY ™ IO 3701 25% AGILITY ™ 1001 | Aluminum substrate |
| Comparative Example E | 50% AMPLIFY ™ IO 3701 50% AGILITY ™ 1001 | Aluminum substrate |
| Comparative Example F | 90% AMPLIFY ™ IO 3701 10% DOW ™ LDPE 132i | Aluminum substrate |
| Inventive Example 3 | 75% AMPLIFY ™ IO 3701 25% DOW ™ LDPE 132i | Aluminum substrate |
| Inventive Example 4 | 50% AMPLIFY ™ IO 3701 50% DOW ™ LDPE 132i | Aluminum substrate |
| Inventive Example 5 | 90% AMPLIFY ™ IO 3701 10% ENGAGE 8180 | Aluminum substrate |
| Inventive Example 6 | 75% AMPLIFY ™ IO 3701 25% ENGAGE 8180 | Aluminum substrate |
| Comparative Example G | 50% AMPLIFY ™ IO 3701 50% ENGAGE ™ 8180 | Aluminum substrate |
| Comparative Example H | 100% SURLYN 1650 | Aluminum substrate |
| Inventive Example 7 | 90% SURLYN 1650 10% AGILITY ™ 1001 | Aluminum substrate |
| Inventive Example 8 | 75% SURLYN 1650 25% AGILITY ™ 1001 | Aluminum substrate |
| Inventive Example 9 | 90% SURLYN 1652 10% AGILITY ™ 1001 | Aluminum substrate |
| Inventive Example 10 | 75% SURLYN 1652 25% AGILITY ™ 1001 | Aluminum substrate |
| Inventive Example 11 | 90% SURLYN 1702 10% AGILITY ™ 1001 | Aluminum substrate |
| Inventive Example 12 | 75% SURLYN 1702 25% AGILITY ™ 1001 | Aluminum substrate |

Layer A is coated as a monolayer onto the aluminum substrate as described below.

All of the examples herein are prepared by extrusion coating the polymer layer (Layer A) onto the aluminum substrate (Layer B) utilizing a Black Clawson extrusion coater. Pellets of the polymer used for Layer A in Comparative Example A is fed directly from a box of commercial material. Layer A in Comparative Examples B—H and Inventive Examples 1-12 are prepared by dry blending the prescribed amounts of the two components and feeding the dry blend to the extrusion coater. The aluminum substrate is dropped down onto the moving 50 pounds/ream Kraft paper just prior to the chill roll/rubber roll nip where the aluminum substrate is pulled into the nip thus applying Layer A onto the foil side of the aluminum substrate. The resulting flow rate from the die is ~10 pounds/hour of polymer per inch of die opening. A constant air gap of 6 inches is used in fabricating the sample. Each sample consists of a 1 mil thick monolayer of Layer A coated onto the aluminum substrate. The samples are made at a melt temperature of 300° C. and a line speed of 440 feet per minute.

The adhesion of Layer A to the aluminum substrate for each of the samples is determined using a 180 degree peel test based on ASTM standard F904 with a crosshead speed of 10 inches/minute. At least five samples of each Comparative/Inventive Example are measured, and the average values and standard deviations are calculated. The results are shown in Table 2:

TABLE 2

| | Foil Adhesion (N/in.) | RVR | Blend Formula Value |
|---|---|---|---|
| Comparative Example A | 5.13 ± 0.66 | N/A | NA (does not contain added polyolefin) |
| Comp. Example B | 2.48 ± 1.07 | 0.36 | 3.41 |
| Comp. Example C | 3.88 ± 0.49 | 0.36 | 3.06 |
| Comp. Example D | 3.25 ± 0.65 | 0.36 | 2.49 |
| Inv. Example 1 | 6.84 ± 0.33 | 0.13 | 4.33 |
| Inv. Example 2 | 5.66 ± 0.50 | 0.13 | 3.99 |
| Comp. Example E | 2.24 ± 0.11 | 0.13 | 3.41 |
| Comp. Example F | 2.85 ± 0.58 | 0.05 | 4.64 |
| Inv. Example 3 | 5.03 ± 0.49 | 0.05 | 4.29 |
| Inv. Example 4 | 5.35 ± 0.49 | 0.05 | 3.72 |
| Inv. Example 5 | 5.91 ± 0.58 | 0.10 | 4.45 |
| Inv. Example 6 | 4.74 ± 0.33 | 0.10 | 4.10 |
| Comp. Example G | 4.00 ± 1.10 | 0.10 | 3.53 |
| Comparative Example H | 4.42 ± 0.48 | 0.39 | NA (does not contain added polyolefin) |
| Inventive Example 7 | 3.91 ± 0.50 | 0.39 | 82.6 |
| Inventive Example 8 | 4.67 ± 0.61 | 0.39 | 82.3 |
| Inventive Example 9 | 2.94 ± 0.52 | 0.13 | 4.29 |
| Inventive Example 10 | 5.97 ± 0.99 | 0.13 | 3.95 |
| Inventive Example 11 | 7.74 ± 1.11 | 0.0050 | −21.8 |
| Inventive Example 12 | 8.19 ± 1.49 | 0.0050 | −22.1 |

The Blend Formula Value for the polymer blends is calculated using the following formula:

$$2.76 - 60 * I_{2(PO)} + 308 * RVR + 0.023 * A$$

The relative viscosity ratio (RVR) is determined from the melt indices ($I_2$) of the components of Layer A by dividing the melt index of the polyolefin ($I_{2(PO)}$) by the melt index of the ionomer ($I_{2(ionomer)}$). A is the weight percent of ionomer in the polymer blend based on the total weight of the blend. Inventive Examples 1-12 advantageously provide comparable or improved adhesion compared to a layer formed from 100% ionomer. Inventive Examples 1-3 and 5 advantageously provided such adhesion without sacrificing process stability as shown below in connection with Table 3.

It should also be noted that some embodiments of polymer blends comprising ionomers of copolymers of ethylene and methacrylic acid provide adequate adhesion over a broader range of Blend Formula Values.

The neck-in and draw down speeds for these samples are also measured and the results are shown in Table 3 (in addition to the Blend Formula Value):

TABLE 3

| | Blend Formula Value | Neck-in (in.) @440 fpm | Draw Down Speed (fpm) | Reduced Draw Down Speed (fpm) |
|---|---|---|---|---|
| Comp. Example A | NA (does not contain added polyolefin) | 4 | 1500+ (no web tear) | 1500+ (no web tear) |
| Comp. Example B | 3.41 | 3.5 | 1500+ (no web tear) | 1500+ (no web tear) |
| Comp. Example C | 3.06 | 4.5 | 1500+ (no web tear) | 1500+ (no web tear) |
| Comp. Example D | 2.49 | —$^a$ | —$^a$ | —$^a$ |
| Inv. Example 1 | 4.33 | 4.125 | 1500+ (no web tear) | 1500+ (no web tear) |
| Inv. Example 2 | 3.99 | 3 | 1500+ (no web tear) | 1500+ (no web tear) |
| Comp. Example E | 3.41 | 3.375 | 900 | 600 |
| Comp. Example F | 4.64 | 4.375 | 1500+ (no web tear) | 1336 |
| Inv. Example 3 | 4.29 | 4.375 | 1500+ (no web tear) | 1336 |
| Inv. Example 4 | 3.72 | 2.75 | 800 | 550 |
| Inv. Example 5 | 4.45 | 4 | 1500+ (no web tear) | 1500+ (no web tear) |
| Inv. Example 6 | 4.10 | —$^a$ | —$^a$ | —$^a$ |
| Comp. Example G | 3.53 | 5.625 | 1500+ (no web tear) | 1336 |
| Comp. Example H | NA (does not contain added polyolefin) | 2.125 | 1500 | 1500 (edge web tear) |
| Inv. Example 7 | 82.6 | 2.25 | 1500 | —$^a$ |
| Inv. Example 8 | 82.3 | 2.875 | 1400 | —$^a$ |
| Inventive Example 9 | 4.29 | 2.00 | 830 | —$^a$ |
| Inventive Example 10 | 3.95 | 2.00 | 613 | —$^a$ |
| Inv. Example 11 | −21.8 | 7.125 | 1500 | 1500 |
| Inv. Example 12 | −22.1 | 8.25 | 1500 | 1500 |

$^a$Not measured.

The neck-in (inches) is measured at a line speed of 440 feet per minute. The draw down speed (feet per minute) is the line speed when a web tear is observed while the screw within the extrusion coater is running at 90 rpm, which results in a flow rate of approximately 250 pounds/hour. The reduced draw down speed (feet per minute) is the line speed when a web tear is observed while the screw within the extrusion coater is running at 45 rpm. The maximum value for draw down speed and reduced draw down speed is 1500 feet per minute, and the reduced draw down speed is only determined if the line speed reaches 1500 feet per minute when the extruder runs at 90 rpm. Table 3 illustrates that Inventive Examples 1-3 and 5 exhibit performance properties that would be acceptable for extrusion coating applications.

We claim:

1. A polymer blend comprising:
   an ionomer of a copolymer comprising ethylene and at least one of acrylic acid and methacrylic acid having a melt index ($I_2$) of 1 to 60 g/10 minutes, wherein the total amount of ionomer comprises 50 to 99 weight percent of the blend based on the total weight of the blend; and
   a polyolefin having a density of 0.870 g/cm$^3$ or more and having a melt index ($I_2$) of 20 g/10 minutes or less, wherein the polyolefin comprises 1 to 50 weight percent of the blend based on the total weight of the blend, wherein the polymer blend meets the following equation:

$$3.5 < 2.76 - 60*I_{2(PO)} + 308*RVR + 0.023*A < 4.5$$

wherein $I_{2(PO)}$ is the melt index ($I_2$) of the polyolefin, RVR is the relative viscosity ratio of the polyolefin to the ionomer ($I_{2(PO)}/I_{2(ionomer)}$), and A is the weight percent of ionomer in the polymer blend based on the total weight of the blend.

2. The polymer blend of claim 1, wherein the polyolefin comprises linear low density polyethylene, low density polyethylene, high density polyethylene, polypropylene, or a combination thereof.

3. The polymer blend of claim 1, wherein the polyolefin comprises low density polyethylene or linear low density polyethylene.

4. The polymer blend of claim 1, wherein the total amount of ionomer comprises at least 75 weight percent of the blend.

5. The polymer blend of claim 1, wherein the metal used to neutralize the acrylic acid or methacrylic acid in the ionomer comprises $Zn^{+2}$, $Na^+$, $Li^+$, $ca^{+2}$, $K^+$, $Mg^{+2}$, $Fe^{+2}$, or $Cu^{+2}$.

6. The polymer blend of claim 1, wherein the melt index ($I_2$) of the polyolefin is less than 10 g/10 minutes.

7. A multilayer structure comprising at least two layers, each layer having opposing facial surfaces, wherein:
   Layer A comprises the polymer blend of claim 1; and
   Layer B comprises a substrate, wherein a top facial surface of Layer B is in adhering contact with a bottom facial surface of Layer A.

8. The multilayer structure of claim 7, wherein the substrate comprises a metal foil, a metallized film, a woven mat, a nonwoven mat, a scrim, or a film layer comprising an ionomer.

9. The multilayer structure of claim 8, further comprising Layer C, wherein a top facial surface of Layer A is in adhering contact with a bottom facial surface of Layer C, wherein Layer C comprises a polyolefin.

10. The multilayer structure of claim 7, wherein the adhesion of Layer A to Layer B is at least 3 N/inch when measured using a 180 degree peel test based on ASTM F904 with a crosshead speed of 10 inches/minute.